United States Patent
Kato et al.

(10) Patent No.: US 8,358,910 B2
(45) Date of Patent: Jan. 22, 2013

(54) VIDEO SIGNAL RECORDING APPARATUS, VIDEO SIGNAL REPRODUCING APPARATUS AND VIDEO SIGNAL RECORDING AND REPRODUCING APPARATUS

(75) Inventors: Daisaku Kato, Sagamihara (JP); Kazuya Tanabe, Yokosuka (JP)

(73) Assignee: JVC Kenwood Corporation, Kanagawa (JP)

( * ) Notice: Subject to any disclaimer, the term of this patent is extended or adjusted under 35 U.S.C. 154(b) by 1604 days.

(21) Appl. No.: 11/807,739

(22) Filed: May 30, 2007

(65) Prior Publication Data

US 2007/0230905 A1    Oct. 4, 2007

Related U.S. Application Data

(63) Continuation of application No. 09/956,731, filed on Sep. 19, 2001, now abandoned.

(30) Foreign Application Priority Data

Sep. 27, 2000   (JP) ................................ 2000-293739

(51) Int. Cl.
*H04N 9/80* (2006.01)
*H04N 5/783* (2006.01)
*H04N 6/29* (2006.01)
*H04N 7/10* (2006.01)
*H04N 7/025* (2006.01)
*H04N 5/445* (2006.01)
*G06F 3/00* (2006.01)
*G06F 13/00* (2006.01)

(52) U.S. Cl. ........ 386/249; 386/239; 386/250; 386/251; 386/343; 386/344; 725/22; 725/32; 725/36; 725/42

(58) Field of Classification Search .................. 386/239, 386/249, 250, 251, 343, 344; 725/22, 32, 725/36, 42

See application file for complete search history.

(56) References Cited

U.S. PATENT DOCUMENTS

| | | | |
|---|---|---|---|
| 6,002,831 A * | 12/1999 | Tada et al. ...................... | 386/249 |
| 6,292,618 B1 * | 9/2001 | Ohara et al. ................... | 386/213 |
| 6,950,604 B1 * | 9/2005 | Kato et al. ..................... | 386/211 |
| 2002/0191950 A1 * | 12/2002 | Wang ............................. | 386/46 |

FOREIGN PATENT DOCUMENTS

| | | |
|---|---|---|
| JP | 10174033 | 6/1998 |
| WO | WO 98/07273 | 2/1998 |

OTHER PUBLICATIONS

EPO International Search Report (dated Nov. 11, 2009—3 pages).

* cited by examiner

*Primary Examiner* — Daquan Zhao
(74) *Attorney, Agent, or Firm* — Renner, Kenner, Greive, Bobak, Taylor & Weber (57) ABSTRACT

An information signal is received, which includes a main information content signal carrying the contents of the information, a CM portion signal carrying commercial messages (CM) and an information mode discriminating signal used for discriminating information modes of the main information content signal and the CM signal from each other according to the contents. A video signal is encoded per plurality of several video frames, the video signal including the main information content signal and the CM portion signal. The encoded video signal is recorded in a storage medium. The video signal is reproduced, during the recording, from the storage medium while the CM portion signal is skipped. The received main information content signal and CM portion signal are recorded in the storage medium. The information mode discriminating signal is recorded in the storage medium or another temporary storage medium. At least the information mode discriminating signal is retrieved from the storage medium or the temporary storage medium. Locations of the recorded CM portion signal in the storage medium is detected based on information mode corresponding to the CM portion signal among a plurality of information modes discriminated by means of the information mode discriminating signal. The main information content signal is reproduced from the storage medium while skipping the CM portion signal based on recorded positions of the video signal encoded per plurality of video frames corresponding to the detected locations of the recorded CM portion signal.

8 Claims, 5 Drawing Sheets

VIDEO SIGNAL RECORDING APPARATUS, VIDEO SIGNAL REPRODUCING APPARATUS AND VIDEO SIGNAL RECORDING AND REPRODUCING APPARATUS

CROSS REFERENCE TO RELATED APPLICATION

This application is a continuation of U.S. patent application Ser. No. 09/956,731 filed on Sep. 19, 2001 now abandoned.

BACKGROUND OF THE INVENTION

The present invention relates to a video signal recording apparatus, a video signal reproducing apparatus and a video signal recording and reproducing apparatus having a function of skipping commercial messages (abbreviated to CM hereinafter) and reproducing TV programs only in reproduction modes such as follow-up reproduction, cache recording/reproduction and variable-speed reproduction from a randomly accessible storage medium such as a hard disc on which video and audio signal have been recorded.

Here, the follow-up reproduction is a technique for reproducing already recorded portions while recording a TV program.

The cache recording/reproduction is a technique for sequentially recording video/audio information in a bitstream recording area for a certain period with overwriting new information on the oldest recorded information when recording has been carried out to the last portion of the recording area and reproducing video/audio information for a certain period from the information recorded before.

There are three modes, namely, monaural, bilingual and stereophonic for audio signals to be broadcast with video signals. One of the modes is selected in accordance with a TV program to be broadcast. Video signals are broadcast with audio signals of selected audio mode.

TV programs are broadcast with CM portions. Audio modes are mostly different between TV programs and CM portions. There are video tape recorders (VTR) having a CM-cutting function in which audio modes for TV programs and CM portions are discriminated from each other so that CM portions will not be recorded based on the detected modes.

This technique for discriminating TV programs and CM portions from each other based on difference in audio mode is used in home-use VTRs because of low cost. Most CMs are broadcast in stereophonic mode. Thus, in this technique, when a broadcast TV program is in monaural or bilingual audio mode, stereophonic mode portions broadcast with the TV program are detected as CM portions, and thus the stereophonic audio mode portions will not be recorded.

Video signals are mostly recorded and reproduced by VTRs. However, a multi-functional video signal-recording/reproducing apparatus for recording/reproducing bitstreams of coded video signals on/from a storage medium such as a hard disc with high accessibility will be introduced in the near future.

The multi-functional video signal-recording/reproducing apparatus can record several TV programs at the same time because of short access time to recorded signals. The apparatus further has a follow-up reproduction function in which recording of a TV program for recording has been started is proceeding while reproduction follows up and reaches the TV program now on air.

Another type of multi-functional video signal-recording/reproducing apparatus is to record types of information such as a TV program itself and a CM portion as management data on a storage medium at portions different from video and audio information and reproduce the TV program with skipping the CM portion based on the management data.

Recording of TV programs without CM portions in home-use VTRs should avoid malfunctions which could occur due to such recording. This is because a TV program broadcast in stereophonic mode causes difficulty in discriminating the TV program from the CM portions. Thus, CM-cutting will be nonfunctional. And, if this function is erroneously set, the head portion of a TV program is detected as a CM portion, thus recording of the TV program will not start.

Such a problem also occurs for disc-recording/reproduction apparatus using a disc-like storage medium with short accessing time. This apparatus has a CM detector to detect a period of CM portions while recording TV programs. Data on the detected period of CM portions is temporary stored in a memory controlled by a microcomputer. The stored CM-period data is recorded on a certain position of a disc at time of completion of TV program-recording.

The recording of CM-period data is similar to a technique for writing management data as TOC (Table of Contents) data on a certain position of an MD (Mini Disc which is a magneto-optical disc) when recording is completed. MDs are used for audio systems that mainly record audio signals.

Known disc-recording/reproduction apparatus record CM-period data on a storage medium when recording of a TV program is completed and retrieve the management data in reproduction. The retrieved disc-management data such as CM-period data is temporary stored in a memory. The known apparatus, however, have no CM-cut or -skip function.

The known apparatus also cannot skip CMs in reproduction while recording of a TV program is proceeding, such as, in follow-up reproduction and cache reproduction/recording.

SUMMARY OF THE INVENTION

A purpose of the present invention is to provide an apparatus and a method of recording and/or reproducing a video signal, capable of CM skipping in normal reproduction, follow-up reproduction and cache recording/reproduction.

The present invention provides a video signal recording apparatus comprising: a video signal recorder for receiving an information signal including a main information content signal carrying the contents of the information, a CM portion signal carrying commercial messages (CM) and an information mode discriminating signal used for discriminating information modes of the main information content signal and the CM signal from each other according to the contents, encoding a video signal per plurality of video frames, the video signal including the main information content signal and the CM portion signal, and recording the encoded video signal in a storage medium so that the CM portion signal is skipped when the video signal is reproduced from the storage medium; a signal recorder for recording the received main information content signal and CM portion signal in the storage medium and recording the information mode discriminating signal in the storage medium or another temporary storage medium; a signal retriever for retrieving at least the information mode discriminating signal from the storage medium or the temporary storage medium; a detector for detecting locations of the recorded CM portion signal in the storage medium based on information mode corresponding to the CM portion signal among a plurality of information modes discriminated by means of the information mode discriminating signal; and a management data recorder for recording recorded position management data in the storage medium, the recorded position management data including data on the detected positions of the CM portion signal, data on video signal-recorded positions based on recorded positions of the video signal encoded per plurality of several video frames.

Moreover, the present invention provides a video signal recording and reproducing apparatus comprising: a video signal recorder/reproducer for receiving an information signal including a main information content signal carrying the contents of the information, a CM portion signal carrying commercial messages (CM) and an information mode discriminating signal used for discriminating information modes of the main information content signal and the CM signal from each other according to the contents, encoding a video signal per plurality of several video frames, the video signal including the main information content signal and the CM portion signal, recording the encoded video signal in a storage medium, and reproducing the video signal, during the recording, from the storage medium while the CM portion signal is skipped; a signal recorder for recording the received main information content signal and CM portion signal in the storage medium and recording the information mode discriminating signal in the storage medium or another temporary storage medium; a signal retriever for retrieving at least the information mode discriminating signal from the storage medium or the temporary storage medium; a detector for detecting locations of the recorded CM portion signal in the storage medium based on information mode corresponding to the CM portion signal among a plurality of information modes discriminated by means of the information mode discriminating signal; and a reproduction controller for reproducing the main information content signal from the storage medium while skipping the CM portion signal based on recorded positions of the video signal encoded per plurality of video frames corresponding to the detected locations of the recorded CM portion signal.

Furthermore, the present invention provides a video signal reproducing apparatus for reproducing a video signal obtained by receiving an information signal including a main information content signal carrying the contents of the information, a CM portion signal carrying commercial messages (CM) and an information mode discriminating signal used for discriminating information modes of the main information content signal and the CM signal from each other according to the contents, encoding a video signal per plurality of video frames, the video signal including the main information content signal and the CM portion signal, recording the encoded video signal in a storage medium, recording the information mode discriminating signal in the storage medium or another temporary storage medium; retrieving the information mode discriminating signal from in the storage medium or the temporary storage medium, and recording data on locations of the CM portion signal obtained based on an information mode corresponding to the CM portion signal among a plurality of information modes discriminated by means of the information mode discriminating signal in the storage medium or the temporary storage medium, the apparatus comprising: a reproducer for reproducing the main information content signal from the storage medium while skipping the CM portion signal based on the data on locations of the CM portion signal that is retrieved from the storage medium or the temporary storage medium; a CM-skipping setter for setting a CM-skipping function so that the CM portion signal is automatically skipped while the main information content signal is reproduced from the storage medium; and a reproduction controller for reproducing the main information content signal at a set reproduction speed while skipping the CM portion signal even if the set reproduction speed is different from a standard speed based on the data on locations of the CM portion signal when the CM-skipping function is set.

Furthermore, the present invention provides a video signal reproducing apparatus for reproducing a video signal obtained by receiving an information signal including a main information content signal carrying the contents of the information, a CM portion signal carrying commercial messages (CM) and an information mode discriminating signal used for discriminating information modes of the main information content signal and the CM signal from each other according to the contents, encoding a video signal per plurality of video frames, the video signal including the main information content signal and the CM portion signal, recording the encoded video signal in a storage medium, recording the information mode discriminating signal in the storage medium or another temporary storage medium; retrieving the information mode discriminating signal from in the storage medium or the temporary storage medium, and recording data on locations of the CM portion signal obtained based on an information mode corresponding to the CM portion signal among a plurality of information modes discriminated by means of the information mode discriminating signal in the storage medium or the temporary storage medium, the apparatus comprising: a reproducer for reproducing the main information content signal from the storage medium while skipping the CM portion signal based on the data on locations of the CM portion signal that is retrieved from the storage medium or the temporary storage medium; a skip reproduction controller for controlling the reproduction of the video signal while skipping a portion of the video signal for a given reproducing time; and a reproduction controller for detecting a starting point of the video signal for next reproduction based on the data on locations of the CM portion signal when the portion of the video signal is skipped and controlling the reproduction to perform at a starting point of the main information content signal when detected starting point of the video signal is at least either a point of a signal that follows the main information content signal that starts after the CM portion signal has been finished or a point that comes during a period of the CM portion signal and also of a signal followed by the main information content signal.

Moreover, the present invention provides a method of recording a video signal comprising the steps of: receiving an information signal including a main information content signal carrying the contents of the information, a CM portion signal carrying commercial messages (CM) and an information mode discriminating signal used for discriminating information modes of the main information content signal and the CM signal from each other according to the contents; encoding a video signal per plurality of video frames, the video signal including the main information content signal and the CM portion signal; recording the encoded video signal in a storage medium so that the CM portion signal is skipped when the video signal is reproduced from the storage medium; recording the received main information content signal and CM portion signal in the storage medium and recording the information mode discriminating signal in the storage medium or another temporary storage medium; retrieving at least the information mode discriminating signal from the storage medium or the temporary storage medium; detecting locations of the recorded CM portion signal in the storage medium based on information mode corresponding to the CM portion signal among a plurality of information modes discriminated by means of the information mode discriminating signal; and recording recorded position management data in the storage medium, the recorded position management data including data on the detected positions of the CM portion signal, data on video signal-recorded positions based on recorded positions of the video signal encoded per plurality of several video frames.

Moreover, the present invention provides a method of recording and reproducing a video signal comprising the steps of: receiving an information signal including a main information content signal carrying the contents of the information, a CM portion signal carrying commercial messages (CM) and an information mode discriminating signal used for discriminating information modes of the main information content signal and the CM signal from each other according to the contents; encoding a video signal per plurality of several video frames, the video signal including the main information content signal and the CM portion signal; recording the encoded video signal in a storage medium; reproducing the video signal, during the recording, from the storage medium while the CM portion signal is skipped; recording the received main information content signal and CM portion signal in the storage medium and recording the information mode discriminating signal in the storage medium or another temporary storage medium; retrieving at least the information mode discriminating signal from the storage medium or the temporary storage medium; detecting locations of the recorded CM portion signal in the storage medium based on information mode corresponding to the CM portion signal among a plurality of information modes discriminated by means of the information mode discriminating signal; and reproducing the main information content signal from the storage medium while skipping the CM portion signal based on recorded positions of the video signal encoded per plurality of video frames corresponding to the detected locations of the recorded CM portion signal.

Furthermore, the present invention provides a method of reproducing a video signal obtained by receiving an information signal including a main information content signal carrying the contents of the information, a CM portion signal carrying commercial messages (CM) and an information mode discriminating signal used for discriminating information modes of the main information content signal and the CM signal from each other according to the contents, encoding a video signal per plurality of video frames, the video signal including the main information content signal and the CM portion signal, recording the encoded video signal in a storage medium, recording the information mode discriminating signal in the storage medium or another temporary storage medium; retrieving the information mode discriminating signal from in the storage medium or the temporary storage medium, and recording data on locations of the CM portion signal obtained based on an information mode corresponding to the CM portion signal among a plurality of information modes discriminated by means of the information mode discriminating signal in the storage medium or the temporary storage medium, the method comprising the steps of: reproducing the main information content signal from the storage medium while skipping the CM portion signal based on the data on locations of the CM portion signal that is retrieved from the storage medium or the temporary storage medium; setting a CM-skipping function so that the CM portion signal is automatically skipped while the main information content signal is reproduced from the storage medium; and reproducing the main information content signal at a set reproduction speed while skipping the CM portion signal even if the set reproduction speed is different from a standard speed based on the data on locations of the CM portion signal when the CM-skipping function is set.

Moreover, the present invention provides a method of reproducing a video signal obtained by receiving an information signal including a main information content signal carrying the contents of the information, a CM portion signal carrying commercial messages (CM) and an information mode discriminating signal used for discriminating information modes of the main information content signal and the CM signal from each other according to the contents, encoding a video signal per plurality of video frames, the video signal including the main information content signal and the CM portion signal, recording the encoded video signal in a storage medium, recording the information mode discriminating signal in the storage medium or another temporary storage medium; retrieving the information mode discriminating signal from in the storage medium or the temporary storage medium, and recording data on locations of the CM portion signal obtained based on an information mode corresponding to the CM portion signal among a plurality of information modes discriminated by means of the information mode discriminating signal in the storage medium or the temporary storage medium, the method comprising the steps of: reproducing the main information content signal from the storage medium while skipping the CM portion signal based on the data on locations of the CM portion signal that is retrieved from the storage medium or the temporary storage medium; controlling the reproduction of the video signal while skipping a portion of the video signal for a given reproducing time; and detecting a starting point of the video signal for next reproduction based on the data on locations of the CM portion signal when the portion of the video signal is skipped and controlling the reproduction to perform at a starting point of the main information content signal when detected starting point of the video signal is at least either a point of a signal that follows the main information content signal that starts after the CM portion signal has been finished or a point that comes during a period of the CM portion signal and also of a signal followed by the main information content signal.

DETAILED DESCRIPTION OF PREFERRED EMBODIMENTS

Preferred embodiments according to the present invention will be disclosed with reference to the attached drawings.

<Video Signal Recoding Apparatus>

Figure 1:
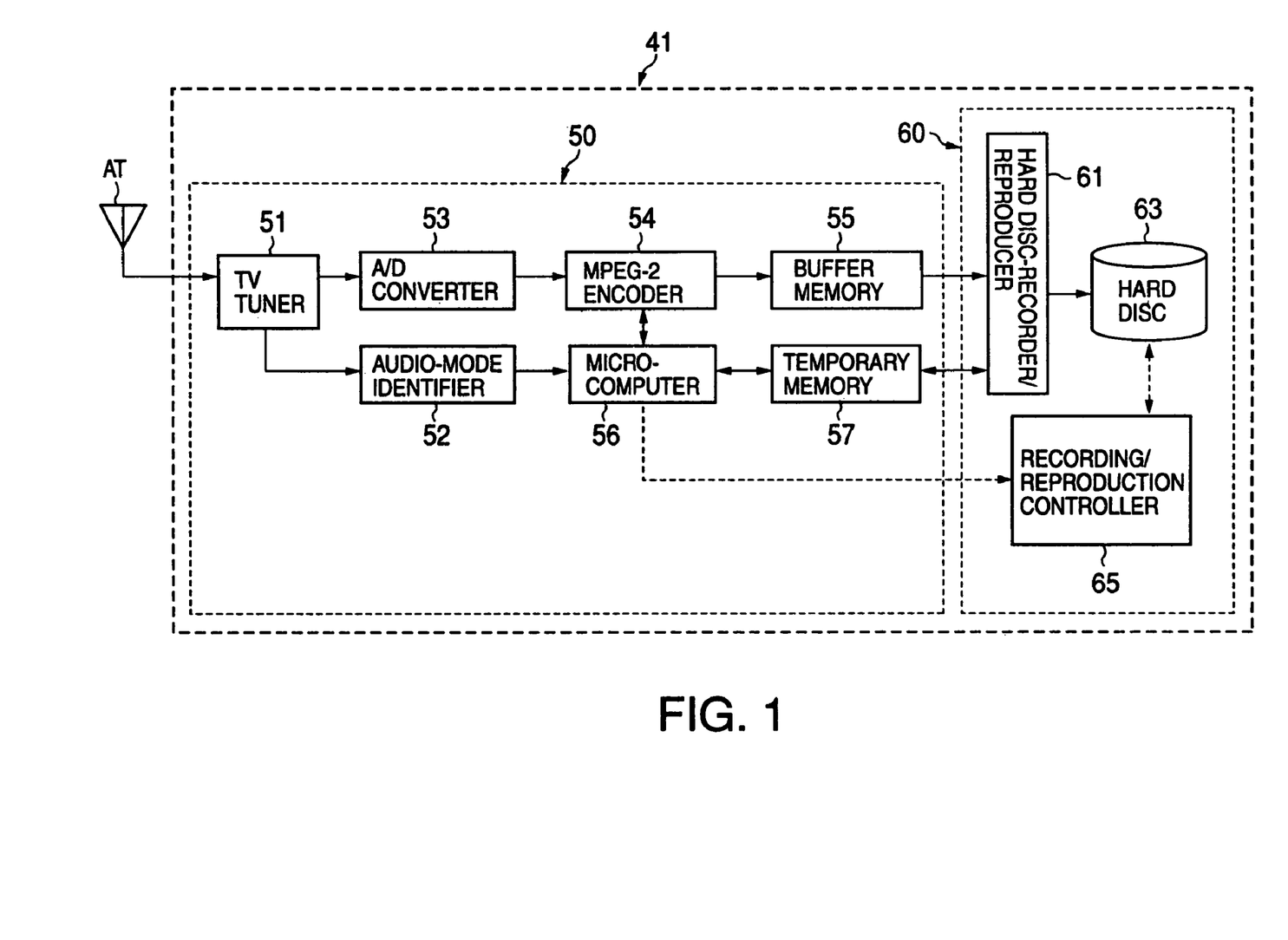
FIG. 1 shows a block diagram of an embodiment of a video signal recording apparatus according to the present invention.

FIG. 1 shows a block diagram of an embodiment of a video signal recording apparatus 41 for recording video signals on a hard disc according to the present invention.

The video signal-recording apparatus 41 is provided with an encoder section 50 for receiving a TV signal that is broadcast in a certain audio mode via an antenna AT and a recording/reproducing section 60 for recording the signal fed from the encoder section 50 on a hard disc and reproducing the recorded signal from the hard disc.

The encoder section 50 is provided with a TV tuner 51, an audio-mode identifier 52, an A/D converter 53, an MPEG-2 (Moving Picture Experts Group-2) encoder 54, a buffer memory 55, a microcomputer 56 and a temporary memory 57.

The recording/reproducing section 60 is provided with a hard disc-recorder/reproducer 61, a hard disc 63 and a recording/reproduction controller 65.

An operation of the video signal recording apparatus 41 is disclosed.

A TV signal carrying a TV program signal and a CM signal broadcast from a TV station is received by the antenna AT and supplied to the TV tuner 51. The TV program signal that is a base-band video signal is demodulated from the radio-frequency TV signal.

The demodulated signal is supplied to the A/D converter 53 and converted into a digital video signal. The digital video signal is supplied to the MPEG-2 encoder 54 for highly efficient encoding in accordance with MPEG-2 under ISO/IEC (International Organization Standardization/International Electrotechnical Commission).

The signal encoded by the highly efficient encoding is supplied to the buffer memory 55 and stored therein temporary.

The stored signal is supplied to the hard disc-recorder/reproducer 61 and subjected to signal processing such as modulation for recording. The processed signal is supplied to the hard disc 63 and stored thereon with a mode-identifying signal.

The mode-identifying signal is generated based on an audio-mode signal.

In detail, a signal component of the signal demodulated by the TV tuner 51 is supplied to the audio-mode identifier 52. The identifier 52 identifies an audio-mode signal of the received TV signal such as a stereophonic, monaural or bilingual signal.

The audio-mode signal is supplied to the microcomputer 56. The microcomputer 56 generates disc-management data including the audio-mode data (signal).

The disc-management data is stored in the memory 57 temporary and, after a certain period of time elapses, it is further stored on the hard disc 63 via the hard disc-recorder/reproducer 61. Signals to be stored on the hard disc 63 are time-shared signals divided into sectors.

Figure 2:
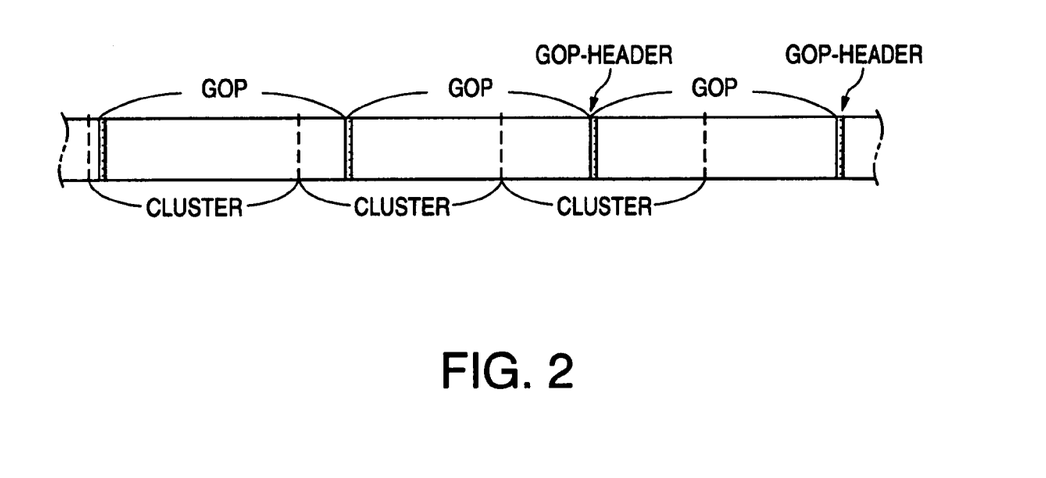
FIG. 2 illustrates the relationship among clusters, GOPs and GOP headers in the embodiment according to the present invention.

FIG. 2 illustrates an MPEG-2-encoded signal that is divided into clusters on the hard disc 63.

A digital TV signal converted by the A/D converter 53 is encoded by the MPEG-2 encoder 54 per GOP (Group of Pictures) of a GOP-header, an I (Intra)-picture, a plurality of P(Predictive)-pictures and a plurality of B(Bi-directionally-Predictive)-pictures.

The encoded signal is divided into signal components for sectors and stored on the hard disc 63.

The signal components allocated to sectors are given sector numbers. The numbered-sector signals are stored on the hard disc 63 at respective certain positions. The relationship between the stored signals and the corresponding sector numbers are also stored as the disc-management data on a management data-storing area of the hard disc 63.

Disclosed next is generation and recording of management data by the microcomputer 56. The management data include data on recorded positions of the signals encoded per GOP and of audio-mode signals.

The microcomputer 56 controls recording on the hard disc 63 and the signal processing by the MPEG-2 encoder 54.

Data supplied to the microcomputer 56 from the MPEG-2 encoder 54 indicates sequence control on bitstreams of video and audio signals encoded under MPEG-2 and encoding-types for I-, P- and B-pictures of one GOP, a unit to be encoded.

Data on encoding includes the number of bytes that indicates an amount of data of each GOP, the number of frames of each GOP, a presentation time stamp, and so on.

These detailed data on encoding are also stored on the hard disc 63 as management data. The management data are very effective, for example, for special reproduction for decoding and displaying I-frames only because I-frame picture data are easily obtained through the management data.

The microcomputer 56 further controls recording/reproduction to/from the hard disc 63 with address management on the disc. The microcomputer 56 decides the locations on the hard dice 63 on which GOP signals are to be recorded and generates GOP-recording positional data.

The microcomputer 56 generates management data including positional data that indicates whether a video signal composed of GOPs is a TV program signal or a CM signal in addition to the detailed data on GOPs described above. The management data is stored in the memory 57 temporary.

The management data temporary stored in the memory 57 are recorded on the hard disc 63 per predetermined period.

The recording areas on the hard disc 63 are divided into a bitstream recording area and a management recording area.

GOP signals carrying bitstreams are firstly recorded on the bitstream recording area and then the management data are retrieved from the memory 57 and recorded on management recording area.

When a TV signal received via the antenna AT is a digital TV signal that carries MPEG-2 bitstreams, the TV signal can be directly supplied to the buffer memory 55 from the TV tuner 51 without be processed by the MPEG-2 encoder 54.

Data on GOPS obtained from the digital TV signal output by the TV tuner 51 can be supplied to the microcomputer 56 for recording on the hard disc 63 as described above.

Disclosed next is generation of CM-portion data based on the management data described above and recording of the CM-portion data on the hard disc 63.

Generation of CM-portion data that discriminates a CM portion from a TV program is performed by the microcomputer 56. When a TV signal is composed of several audio-mode signals, a stereophonic-mode signal component that is shorter than 5 min., for example, is detected as a CM portion.

Figure 3:
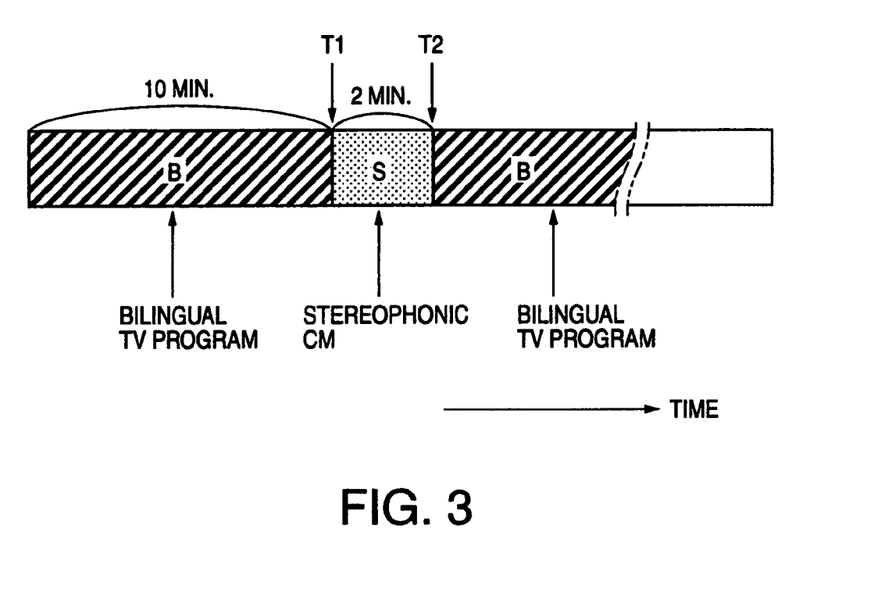
FIG. 3 illustrates an audio mode-time chart for CMs and a TV program in the embodiment according to the present invention.

FIG. 3 illustrates an audio mode-time chart for a movie broadcast by TV-terrestrial broadcasting.

In FIG. 3, sections "B" and "S" indicate a bilingual-mode portion and a stereophonic-mode portion, respectively.

The time at a moment T1 at which a mode is changed from the bilingual- to stereophonic-mode is stored in a RAM (not shown) connected to the microcomputer 56.

The time difference between a moment T2 at which a mode is changed from the stereophonic- to bilingual-mode and the moment T1 is obtained. The section "S" is determined as a CM portion when the time difference (T2−T1) is 3 sec., or more but less than 5 min., for example.

Three seconds is set as the minimum time for determination of a CM portion because a broadcasting time less than 3 sec., is too short for a CM portion and an audio mode detected within 3 sec., may be wrong if it is detected as a stereophonic mode.

A video signal, namely, the encoded data GOPs from the moment T1 to (T2−1) that is a moment just before the moment T2 is managed.

GOP management data is given a CM-data flag for identification of a CM portion.

Figure 4:
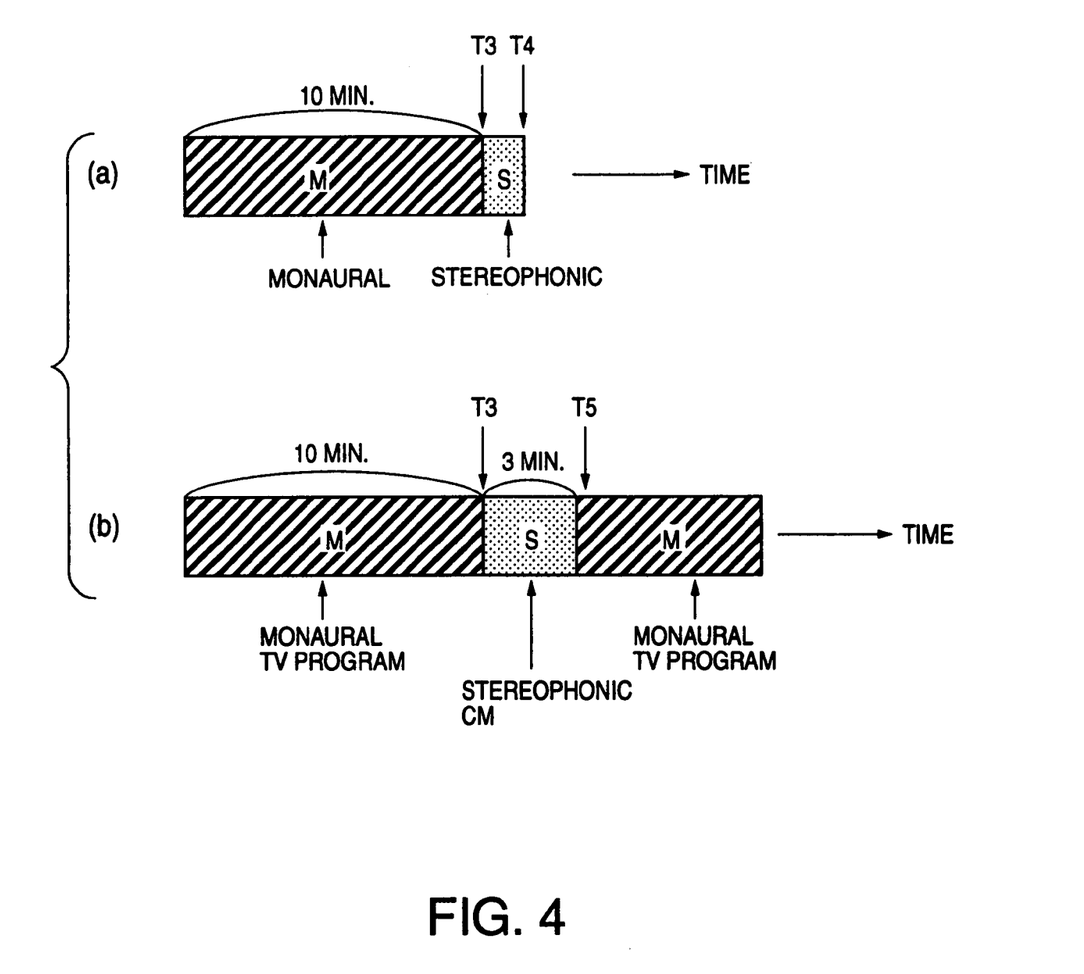
FIG. 4 illustrates a time chart for CMs and a TV program received in different audio modes in the embodiment according to the present invention.

Determination of a CM portion as time elapses is explained with reference to FIG. 4.

FIG. 4(a) illustrates that a TV signal has been received in a monaural (M) audio mode for 10 min., and then the mode is changed to a stereophonic (S) mode at a moment T3.

This stereophonic mode cannot be determined as a CM portion at a moment T4 because it is too short for receiving the TV signal in the stereophonic mode.

As illustrated in FIG. 4(b), the TV signal has continuously been received and, when the stereophonic mode is changed to the monaural audio mode at a moment T5, the period (T5−T3), for example 3 min., is determined as a CM portion.

As disclosed, the management data generated for recording while a TV program is being received, are recorded on the management recording area of the hard disc 63 per group of GOPs for several minutes.

It may occur that management data on a GOP that is determined as a CM portion at a certain moment has already been recorded on the hard disc 63, not in the memory 57 temporary.

Such management data already recorded on the hard disc 63 is once retrieved from the hard disc 63 with change in a CM-flag and then recorded on the hard disc 63 again. This CM-flag changing operation is a time-shared operation while management data is retrieved and recorded again without interrupting recording of video signal bitstreams.

Disclosed so far is determination of a CM portion in accordance with audio mode of a received TV signal. Not only this, however, a CM portion can be determined in accordance with correlation between videos or change in voice pattern. Furthermore, when CM-indicating data is included in a digitally broadcast TV signal, the data may be extracted from the TV signal for determination of a CM portion.

Data on GOPs determined as a CM portion is generated as management data for managing recorded data with GOP-header data. Such management data-generation requires timing adjustment between a TV-program signal that is received through variable-length encoding under MPEG-2 and data on CM portions that are received at relatively constant intervals.

The timing adjustment is required for the following reason: A head portion of a CM signal starts with scene change, so that a CM signal is generally received relatively early and decoding of a signal encoded under MPEG-2 is completed almost at a time to be displayed on a monitor screen, which is managed by the presentation stamp. On the other hand, a last portion of a CM signal has a small of data such as a still picture for indicating names of sponsors, so that an encoded CM signal is decoded early followed by the next signal of a TV program at the next scene change.

Accordingly, video signals encoded under MPEG-2 and GOP headers are received with variation on time in accordance with redundancy on data of video information.

The timing adjustment between GOP header signals with variation on time and data on CM portions is made based on the CM-portion data (management data) temporary stored in the memory 57 or a RAM (not shown) connected to the microcomputer 56 and to be displayed at the same time as a GOP header.

The management data generated with the timing adjustment may not be recorded on a storage medium for storing video/audio bitstreams when a TV program is finished. For example, the video/audio bitstreams can be recorded on a disc storage medium whereas management data can be recording into a semiconductor memory in a recording/reproduction apparatus that houses the disc storage medium. In other words, the video/audio bitstreams and management data that manages the bitstreams can be recorded on different storage media.

<Video Signal Reproducing Apparatus>

Disclosed next is a video signal reproducing apparatus for reproducing signals recorded as described above on the hard disc 63.

Figure 5:
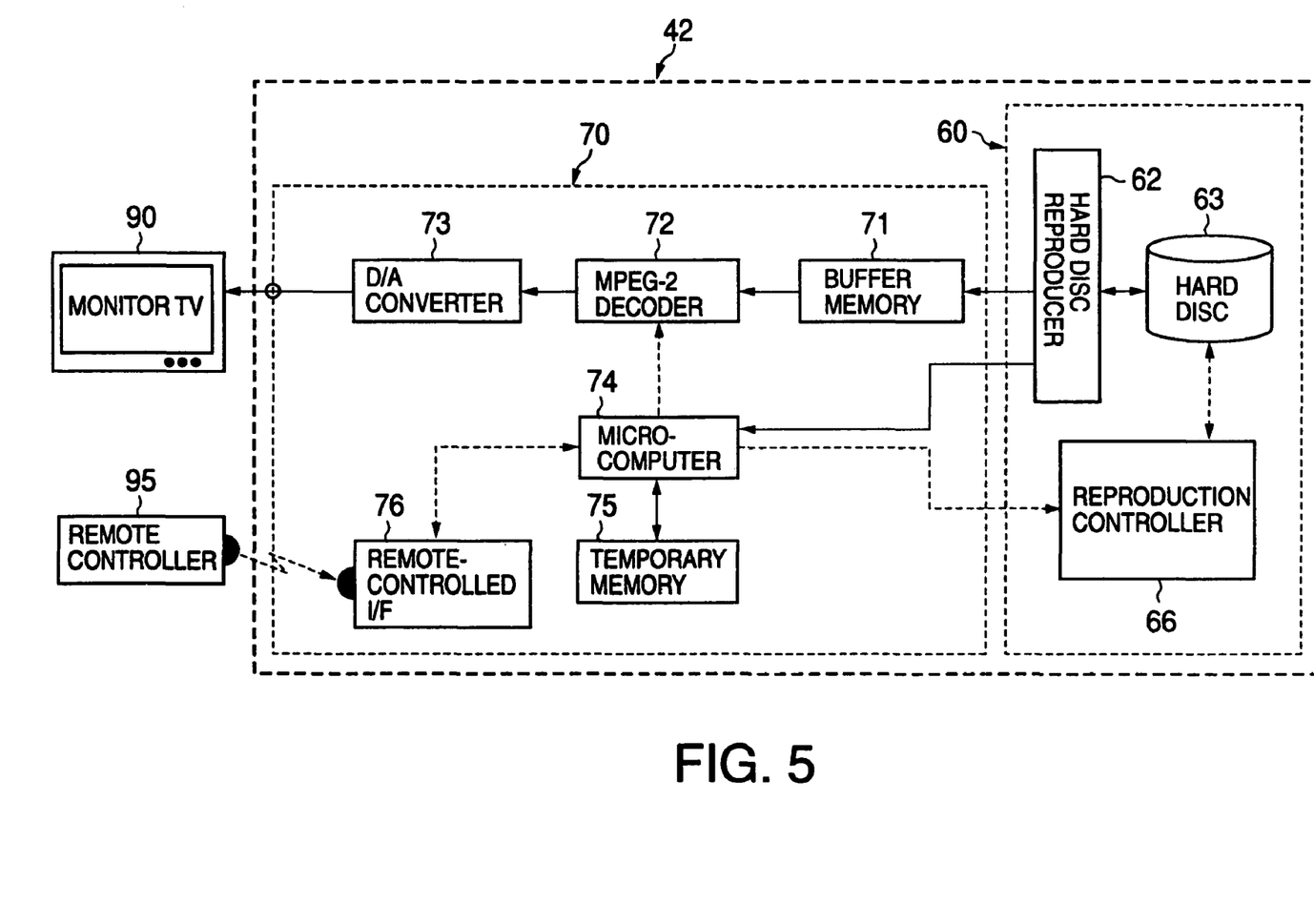
FIG. 5 shows a block diagram of an embodiment of a video signal reproducing apparatus according to the present invention.

A video signal reproducing apparatus 42 is provided, as shown in FIG. 5, with a reproducing section 60 having a hard disc reproducer 62, a hard disc 63 and a reproduction controller 66, and a decoder section 70 having a buffer memory 71, an MPEG-2 -decoder 72, a D/A converter 73, a microcomputer 74, a temporary memory 75, and a remote-controlled interface 76.

Moreover, a monitor 90 and a remote controller 95 are set in the vicinity of the reproducing apparatus 42.

Video/audio bitstreams and their management data have been recorded on the hard disc 63 by the video signal recording apparatus 41 as described above.

A user pushes buttons on the remote controller 95 to select a TV program. An infrared-ray signal modulated with the TV program-selection is sent to the remote-controlled interface 76.

The infrared-ray signal is demodulated by the remote-controlled interface 76 and supplied to the microcomputer 74.

In accordance with the TV program-selection, the microcomputer 74 finds the locations of the management data and video/audio bitstreams on the hard disc 63 based on management data for managing the hard disc 63. The location data are supplied to the reproduction controller 66 for reproduction of data recorded at those locations on the hard disc 63.

The video/audio bitstreams and the management data are subjected to amplification, demodulation and error-correction by the hard disc reproducer 62.

The management data and the video/audio bitstreams processed by the hard disc reproducer 62 are supplied to the microcomputer 74 and the buffer memory 71 for temporal storage, respectively.

The microcomputer 74 determines a decoding type based on the supplied management data that includes GOP encoding-type information. The video/audio bitstreams once stored in the buffer memory 71 are supplied to the MPEG-2 decoder 72 and decoded in accordance with the decoding type from the microcomputer 74, so that highly encoded video and audio signals are decoded.

The decoded video and audio signals are converted into analog video and audio signals by the D/A converter 73. The analog video signals are supplied to the monitor 90 whereas the analog audio signals are supplied to speakers (not shown).

The decoder section 70 outputs an analog video signal and audio signals at left and right channels via separated terminals. Or, MPEG-2-encoded bitstreams reproduced from the hard disc 63 by the hard disc reproducer 62 can be output as digital signals under IEEE1394 (Institute of Electrical and Electronics Engineers 1394) without decoding.

Positions on the hard disc 63 can be set by a reproducing head (not shown) while moving over the hard disc 63 at a high speed for reproduction. Therefore, the video signal recording apparatus 41 records bitstreams on the hard disc 63 over continuous recording areas or on separated areas.

In recording of bitstreams on such separated recording areas, the video signal recording apparatus 41 further records GOP data in the management data on the hard disc 63. And, in reproduction, the reproducing apparatus 42 retrieves the GOP data and detects the recorded positions of the GOPs to be decoded sequentially.

The management data retrieved from the hard disc 63 via the hard disc reproducer 62 is supplied to the microcomputer 74. The microcomputer 74 detects positions on the hard disc 63 for reproduction based on the management data and supplies the detected positional data to the reproduction controller 66. The hard disc 63 is then controlled by the controller 66 so that desired audio and video bitstreams are reproduced from the hard disc 63.

<Video Signal Recording/Reproducing Apparatus>

Figure 6:
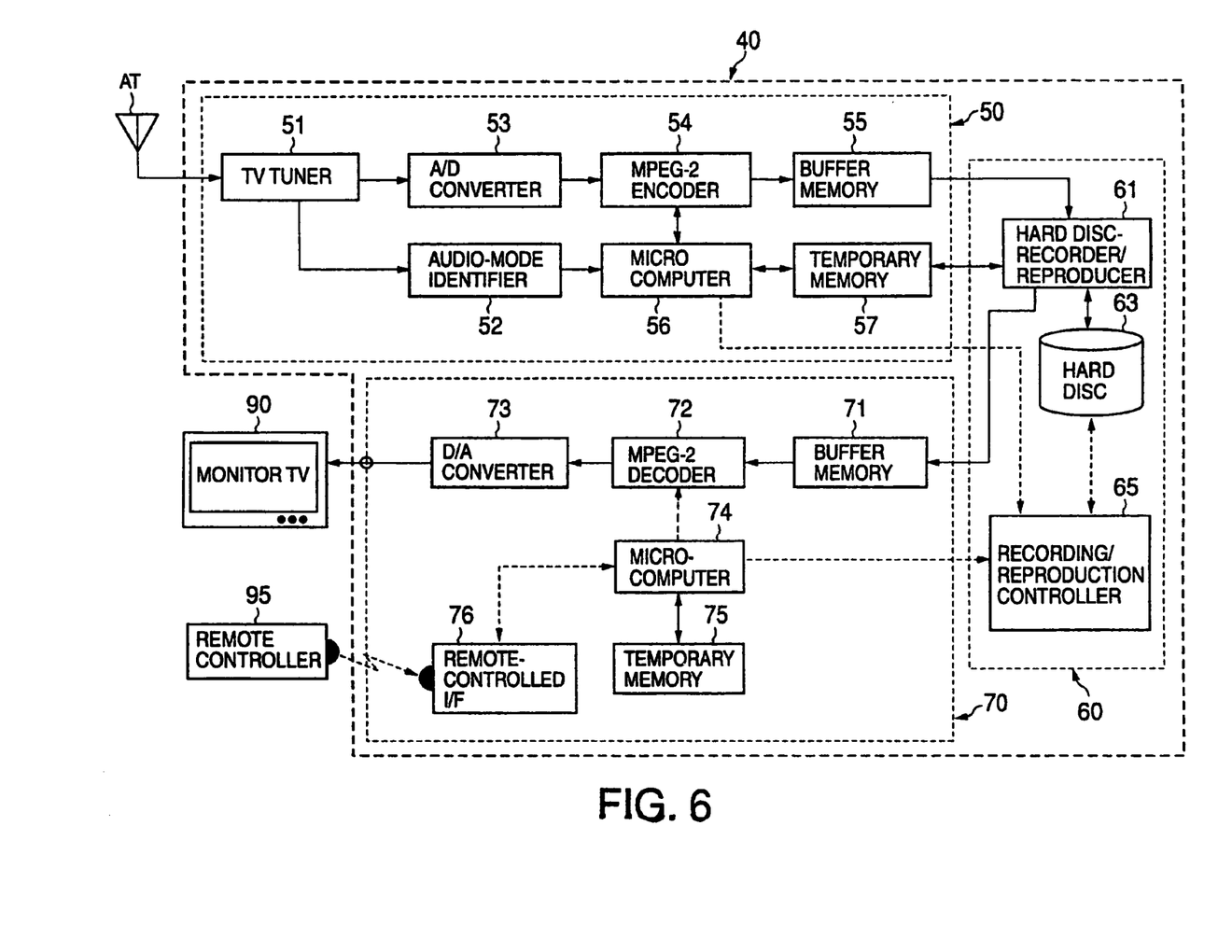
FIG. 6 shows a block diagram of an embodiment of a video signal recording/reproduction apparatus according to the present invention.

The video signal reproducing apparatus 42 can be combined with the video signal recording apparatus 41 as a video signal recording/reproducing apparatus 40 shown in FIG. 6.

The recording/reproducing apparatus 40 is provided with the encoder section 50, the recording/reproducing section 60 and the decoder section 70. Video and audio bitstreams and management data are recorded and reproduced by the apparatus 40 in the same way as disclosed above.

High signal rates on the hard disc recorder/reproducer 61 and the hard disc 63 can be achieved by temporary storing video and audio bitstreams to be recorded and temporary storing reproduced video and audio bitstreams in the buffer memory 71 for high-speed time-shared recording/reproduction (substantially simultaneous recording/reproduction).

Recording and reproduction on and from separated positions on the hard disc 63 can be performed substantially simultaneously by high-speed movement of a magnetic head (not shown) for follow-up reproduction.

In substantially simultaneous recording/reproduction such as follow-up reproduction or cache recording/reproduction, management data stored in the memory 57 temporary is retrieved therefrom for reproduction of signals from the hard disc 63 when management data on the positions to be reproduced have still not been recorded thereon.

As disclosed, either the hard disc 63 or the temporary memory 57 is used as a CM-data storage medium in substantially simultaneous recording/reproduction, the stored CM data being looked up for CM skipping in reproduction.

Management data may be stored only in the temporary memory 57 (not on the hard disc 63) for cache recording/reproduction for recording a limited amount of video and audio bitstreams on the hard disc 63 without reproduction just after the recording.

CM-positional data involved in the management data recorded or stored as above can be retrieved for detection of positions of CM portions so that the CM portions are skipped during reproduction of video/audio bitstreams.

Reproduction of the present GOP is halted when it is detected as a CM portion according to the CM-positional data and then management data on the next GOP is retrieved.

When a retrieved management data on a GOP does not indicate a CM portion, this GOP is reproduced. A CM portion is skipped from a GOP just before the CM portion starts and video and audio bitstreams for TV program are reproduced based on positional data on a GOP just after the CM portion. Detection of GOPs that constitute the CM portion is performed based on a CM flag.

The microcomputer 74 analyzes the GOP-management data to look up a CM flag in a short time so that video and audio signals can be reproduced with no intermission.

Management data including CM data is updated whenever a CM portion is detected during recording of video and audio bitstreams. Such up-dating offers CM skipping in cache recording/reproduction or follow-up reproduction based on CM data included in management data when a user selects CM skipping via the remote controller 95.

CM data have been included in management data together with GOP data indicating recorded positions of GOPs so that the CM data can be retrieved simultaneously with detection of positions of recorded GOPs by looking up the management data in reproduction.

CM-skipping is made possible based on CM-data because a CM-indicating flag is added to a CM portion. This is, however, not possible in follow-up reproduction of signals where no CM portions such as shown in FIG. 4(*a*) are detected.

Moreover, CM-skipping is possible in special reproduction at a slow or a high speed or in reverse reproduction. CM-skipping allowed in reproduction at 3×speed or less when it is selected via the remote controller 95. On the other hand, CM-skipping is prohibited in reproduction at a speed beyond 3×speed.

As disclosed, CM-skipping is adaptively controlled in accordance with reproduction speed. This is because it is general that a user wants to view a TV program for a relatively short time at a certain degree of speed or less whereas he or she wants to find a particular scene or grasp the overall contents of a TV program at higher speed.

Therefore, CM-skipping is useful for viewing a TV program at a relatively slow reproduction speed whereas reproduction of CM portions is useful for grasping the overall contents of a TV program at higher speed in which a user searches for particular scenes based on CM portions that are reproduced at a high speed in a short time.

The CM-skipping function according to the present invention is applicable not only for the embodiments using a hard disc described above but also for known video signal recording/reproducing apparatus using a hard disc or another type of storage medium. When the CM-skipping function of the present invention is applied to known apparatus, CM-positional data can be stored in a storage medium all at once after recording of a TV program is finished.

Disclosed next is CM-skipping via a remote controller for skipping recorded signals for a set period of time.

For example, a specific button on a remote controller is depressed once for skipping 27-sec recorded portions. Depressing the button "n" times ("n" being an integer of 2 or more) results in skipping for certain seconds corresponding to 27+30×(n−1).

This is adapted for skipping CM portions each being inserted into a TV program for (30×m) seconds ("m" being an integer of 1 or more) in general.

The initial skipping time is set at 27 seconds, not (30×n) seconds, due to a delay in CM-skipping operation via a remote controller by a user while reproducing a CM portion.

The adaptive CM-skipping operation via remote controller described above meets several kinds of user requirements such that he or she wants to watch CMs or view another TV program by channel hopping during CM reproduction or reproduce a TV program that follows the CM portions as soon as possible.

This adaptive CM-skipping operation in accordance with user requirements can also be performed with reproduction of data on CM portions indicating whether or not each GOP is a CM portion, that has been recorded with GOP management data.

Moreover, CM portions are skipped for a predetermined period of time in accordance with the number of times of depressing a CM-skip button on the remote controller 95. This skipping operation is controlled by the microcomputer 74 so that a TV program starts at the moment where the CM portions are finished. Reproduction of the TV program would otherwise start after passing the starting point of the TV program that follows the CM portions due to skipping.

In other words, reproduction of the TV program starts at the starting point of the program recorded next to the CM portions even if a period of recorded CM portions is shorter than a CM-skipping period set by a user.

On the other hand, if a period of recorded CM portions is longer than a CM-skipping period set by a user, the set CM-skipping period is reset to a period up to the moment at which CM portions are finished, followed by reproduction at the starting point of the next TV program.

As disclosed, a period from a CM-portion stating point to a finishing points is automatically skipped with no relation to the number of times of depressing CM-skip button when a program is a CM portion at the moment where a user operates the CM-skipping button.

Disclosed so far is an automatic skipping operation in which CM portions that follow a TV program are almost not reproduced but the next TV program is reproduced.

Other methods of CM-portion skipping are such that CM portions are automatically and quickly reproduced or a picture of a TV program before a CM period fades out and then another picture of the TV program after the CM period fades in.

Another method of CM-portion skipping is that specific pictures are inserted for several seconds instead of CM portions. Such pictures may be special images created in video signal recording/reproducing apparatus according to the present invention or pictures including the title of a TV program that is being reproduced now. The title picture to be recorded at the head of the TV program may be used.

This method of inserting edit pictures or other related pictures instead of CM portions matches a general way of TV-program edition in which pictures and sound of a TV program for a short period just before CM portions are inserted just after the CM portions for repetition so that viewers can recall the last scene of the TV program after CM portions.

A known CM-skipping function in such a general way of TV-program edition could make a user uncomfortable when he or she skips CM portions because the pictures displayed just before the skipped CM portions are displayed again. Such a uncomfortable feeling can be lightened by the fade-in/-out processing or insertion of a title picture instead of CM portions as described above.

The video signal recording apparatus and the video signal reproducing apparatus disclosed above may be set closely or apart.

The video signal recording apparatus and the video signal reproducing apparatus can be combined to constitute the video signal reproducing/reproduction apparatus 40 with the shared recording/reproducing section 60 as shown in FIG. 6, as disclosed above. Not only that, the encoder section 50 and the recording/reproducing section 60 can be combined to one unit as a home server to be set at home with set-top box-type decoder section 70 set in several rooms, a TV set being also set in each room, the decoder section 70 being connected to the home server.

The home server and each set-top box act as a bitstream transmitter and a bitstream receiver, respectively, and connected to each other via a high-speed wireless LAN or a home LAN. The transmitter and the receiver communicate each other in two-way communications in which a bitstream of video information recorded on a hard disc 63 is fed to a monitor TV and a demodulated video is displayed thereon via a set-top box operated by a user.

Moreover, the home server and set-top boxes in each home can be connected each other via a provider or a cable TV station, etc., for two-way communications described above among several homes. In order to establish such a network, home servers for several homes may be set, for example, in a cable TV station so that each home requires set-top boxes only.

A hard disc is used as a storage medium in the embodiments described above. Not only that, however, other types of storage medium with high-speed accessibility can be used, such as, a magneto-optical disc, a RAM- or RW-type DVD, and a semiconductor memory.

The recording and/or reproducing apparatus described so far are used for receiving broadcast signals carried by electromagnetic waves and record them on a hard disc.

In addition to electromagnetic waves, however, the apparatus according to the present invention can receive signals carried via a coaxial cable or an optical cable from a CATV station, or via xDSL or ISDN under Internet broadcasting.

The CM-skipping techniques according to the present invention can be applied not only to moving pictures such as motion pictures, as described above, but also audio signals only, game programs for computer use, still pictures, and so on, distributed via Internet broadcasting when they include CMs and their corresponding mode signals.

Moreover, the CM-skipping techniques according to the present invention uses CM-portion positional data inserted at a GOP header under MPEG-2 system as described above. However, the CM-skipping techniques according to the present invention can also be applied to other types of encoding, such as, intra-frame encoding (so-called motion JPEG), MPEG-4, MPEG-7, MPEG-21, and fractal encoding.

Furthermore, CM-flag management is performed per GOP in under MPEG-2 system in the embodiments described above due to that fact that encoding parameters for video signals are managed with GOP headers under MPEG-2 system.

A management method for encoding parameters and also CM flags thus depends on an encoding technique used for received video signals. CM-flag management per unit of video the same as that for encoding parameters makes less the number of accessing time for detection of CM flags thus offering the same advantages discussed above.

As disclosed above, the present invention provides a video signal recording apparatus including: a video signal recorder for receiving an information signal including a main information content signal carrying the contents of the information (such as a TV program), a CM portion signal carrying commercial messages (CM) and an information mode discriminating signal used for discriminating information modes of the main information content signal and the CM signal from each other according to the contents, encoding a video signal per plurality of video frames, the video signal including the main information content signal and the CM portion signal, and recording the encoded video signal in a storage medium so that the CM portion signal is skipped when the video signal is reproduced from the storage medium; a signal recorder for recording the received main information content signal and CM portion signal in the storage medium and recording the information mode discriminating signal in the storage medium or another temporary storage medium; a signal retriever for retrieving at least the information mode discriminating signal from the storage medium or the temporary storage medium; a detector for detecting locations of the recorded CM portion signal in the storage medium based on information mode corresponding to the CM portion signal among a plurality of information modes discriminated by means of the information mode discriminating signal; and a management data recorder for recording recorded position management data in the storage medium, the recorded position management data including data on the detected positions of the CM portion signal, data on video signal-recorded positions based on recorded positions of the video signal encoded per plurality of several video frames.

According to the video signal recording apparatus and the corresponding method, recorded position management data including data on positions of a CM portion signal that is obtained by searching a CM portion recorded on a storage medium based on the CM portion signal can be recorded on the storage medium. With the management data, a video signal recording apparatus that can record a recording signal for a video signal reproducing apparatus that reproduces a main information content signal (such as a TV program) only from the storage medium while skipping the CM portion, can be provided.

Moreover, as disclosed above, the present invention provides a video signal recording and reproducing apparatus including: a video signal recorder/reproducer for receiving an information signal including a main information content signal carrying the contents of the information (such as a TV program), a CM portion signal carrying commercial messages (CM) and an information mode discriminating signal used for discriminating information modes of the main information content signal and the CM signal from each other according to the contents, encoding a video signal per plurality of several video frames, the video signal including the main information content signal and the CM portion signal, recording the encoded video signal in a storage medium, and reproducing the video signal, during the recording, from the storage medium while the CM portion signal is skipped; a signal recorder for recording the received main information content signal and CM portion signal in the storage medium and recording the information mode discriminating signal in the storage medium or another temporary storage medium; a signal retriever for retrieving at least the information mode discriminating signal from the storage medium or the temporary storage medium; a detector for detecting locations of the recorded CM portion signal in the storage medium based on information mode corresponding to the CM portion signal among a plurality of information modes discriminated by means of the information mode discriminating signal; and a reproduction controller for reproducing the main information content signal from the storage medium while skipping the CM portion signal based on recorded positions of the video signal encoded per plurality of video frames corresponding to the detected locations of the recorded CM portion signal.

According to the video signal recording and reproducing apparatus and the corresponding method, recorded position management data including data on positions of a CM portion signal that is obtained by searching a CM portion recorded on a storage medium based on the CM portion signal can be recorded on the storage medium. With the management data, a main information content signal (such as a TV program) is only reproduced from the storage medium while skipping the CM portion.

Moreover, as disclosed above, the present invention provides a video signal reproducing apparatus for reproducing a video signal obtained by receiving an information signal including a main information content signal carrying the contents of the information (such as a TV program), a CM portion signal carrying commercial messages (CM) and an information mode discriminating signal used for discriminating information modes of the main information content signal and the CM signal from each other according to the contents, encoding a video signal per plurality of video frames, the video signal including the main information content signal and the CM portion signal, recording the encoded video signal in a storage medium, recording the information mode discriminating signal in the storage medium or another temporary storage medium; retrieving the information mode discriminating signal from in the storage medium or the temporary storage medium, and recording data on locations of the CM portion signal obtained based on an information mode corresponding to the CM portion signal among a plurality of information modes discriminated by means of the information mode discriminating signal in the storage medium or the temporary storage medium, the apparatus including: a reproducer for reproducing the main information content signal from the storage medium while skipping the CM portion signal based on the data on locations of the CM portion signal that is retrieved from the storage medium or the temporary storage medium; a CM-skipping setter for setting a CM-skipping function so that the CM portion signal is automatically skipped while the main information content signal is reproduced from the storage medium; and a reproduction controller for reproducing the main information content signal at a set reproduction speed while skipping the CM portion signal even if the set reproduction speed is different from a standard speed based on the data on locations of the CM portion signal when the CM-skipping function is set.

According to the video signal reproducing apparatus and the corresponding method, even if the set reproduction speed is different from a standard speed, data on locations of a CM portion signal is obtained from a storage medium, and based on time data that is the data on locations, a main information content signal (such as a TV program) is only reproduced from the storage medium while skipping the CM portion at a speed other than the standard speed.

When the set reproduction speed is higher than a specific speed, both the main information content signal and the CM portion signal are reproduced without skipping the CM portion signal even if the CM-skipping function is set. The CM portion signal can be used as an identifying signal for searching a desired portion of the main information content signal (such as a TV program).

Moreover, as disclosed above, the present invention provides a video signal reproducing apparatus for reproducing a video signal obtained by receiving an information signal including a main information content signal carrying the contents of the information (such as a TV program), a CM portion signal carrying commercial messages (CM) and an information mode discriminating signal used for discriminating information modes of the main information content signal and the CM signal from each other according to the contents, encoding a video signal per plurality of video frames, the video signal including the main information content signal and the CM portion signal, recording the encoded video signal in a storage medium, recording the information mode discriminating signal in the storage medium or another temporary storage medium; retrieving the information mode discriminating signal from in the storage medium or the temporary storage medium, and recording data on locations of the CM portion signal obtained based on an information mode corresponding to the CM portion signal among a plurality of information modes discriminated by means of the information mode discriminating signal in the storage medium or the temporary storage medium, the apparatus including: a reproducer for reproducing the main information content signal from the storage medium while skipping the CM portion signal based on the data on locations of the CM portion signal that is retrieved from the storage medium or the temporary storage medium; a skip reproduction controller for controlling the reproduction of the video signal while skipping a portion of the video signal for a given reproducing time; and a reproduction controller for detecting a starting point of the video signal for next reproduction based on the data on locations of the CM portion signal when the portion of the video signal is skipped and controlling the reproduction to perform at a starting point of the main information content signal when detected starting point of the video signal is at least either a point of a signal that follows the main information content signal that starts after the CM portion signal has been finished or a point that comes during a period of the CM portion signal and also of a signal followed by the main information content signal.

According to the video signal reproducing apparatus and the corresponding method, based on data on locations (time data) of CM portions retrieved from a storage medium, the main information content signal (such as a TV program) is only reproduced at the starting point of the main information content signal while skipping the CM portions for a period shorter than a set skipping time when the set skipping time is longer than the CM portions recorded on the storage medium or for a period longer than the set skipping time when the set skipping time is shorter than the CM portions recorded on the storage medium.

What is claimed is:

1. An apparatus for reproducing a TV signal comprising:
a reproducer to reproduce the TV signal from a storage medium having a bitstream recording area and a management recording area, stored in the bitstream recording area being digital data of a TV signal carrying at least one TV program signal and one CM portion signal carrying commercial message, and stored in the management recording area being management data, having data on locations of the CM portion signal, indicating whether the digital data is the TV program or the commercial message;
a instructor to instruct the reproducer to reproduce the TV signal at a given reproduction speed; and
a controller to control the reproducer so that only the TV program is reproduced based on the data on locations of the CM portion signal when the reproduction speed is equal or lower than a reference speed, whereas both of the TV program and the commercial message are reproduced when the reproduction speed is higher than the reference speed.

2. An apparatus for reproducing a TV signal comprising:
a reproducer to reproduce the TV signal from a storage medium having a bitstream recording area and a management recording area stored in the bitstream recording area being digital data of a TV signal carrying at least one TV program signal and one CM portion signal carrying commercial message, and stored in the management recording area being management data, having data on locations of the CM portion signal, including whether the digital data is the TV program or the commercial message;
a skip button for use in skipping the reproduction of the TV signal for a given period; and
a controller to control the reproducer to skip the commercial message and reproduce the TV program based on the data on locations of the CM portion signal when the skip button is depressed,
wherein the controller controls the reproducer to skip the commercial message and reproduce the TV program that follows the commercial message after the given period elapses even if the stored commercial message is longer than the given period.

3. An apparatus for reproducing a TV signal comprising:
a reproducer to reproduce the TV signal from a storage medium having a bitstream recording area and a management recording area stored in the bitstream recording area being digital data of a TV signal carrying at least one TV program signal and one CM portion signal carrying commercial message, and stored in the management recording area being management data, having data on locations of the CM portion signal, indicating whether the digital data is the TV program or the commercial message;
a skip button for use in skipping the reproduction of the TV signal for a given period; and
a controller to control the reproducer to skip the commercial message and reproduce the TV program based on the data on locations of the CM portion signal when the skip button is depressed,
wherein the controller controls the reproducer to skip the commercial message and reproduce the TV program that follows the commercial message even if current data to be reproduced is the commercial message after the given period elapses.

4. An apparatus for reproducing a TV signal comprising:
a reproducer to reproduce the TV signal from a storage medium having a bitstream recording area and a management recording area, stored in the bitstream recording area being digital data of a TV signal carrying at least one TV program signal and one CM portion signal carrying commercial message, and stored in the management recording area being management data, having data on locations of the CM portion signal, indicating whether the digital data is the TV program or the commercial message;
a skip button for use in skipping the reproduction of the TV signal for a given period; and
a controller to control the reproducer to skip the commercial message and reproduce the TV program based on the data on locations of the CM portion signal when the skip button is depressed,
wherein the controller controls the reproducer to skip the commercial message and reproduce the TV program that follows the commercial message after the given period elapses even if the stored commercial message is shorter than the given period.

5. A method of reproducing a TV signal comprising the steps of:
reproducing the TV signal at a given reproduction speed from a storage medium having a bitstream recording area and a management recording area, stored in the bitstream recording area being digital data of a TV signal carrying at least one TV program signal and one CM portion signal carrying commercial message, and stored in the management recording area being management data, having data on locations of the CM portion signal, indicating whether the digital data is the TV program or the commercial message; and
reproducing only the TV program based on the data on locations of the Cm portion signal when the reproduction speed is equal to or lower than a reference speed, whereas reproducing both of the TV program and the commercial message when the reproduction speed is higher than the reference speed.

6. A method of reproducing a TV signal comprising the steps of:

reproducing the TV signal at a given reproduction speed from a storage medium having a bitstream recording area and a management recording area, stored in the bitstream recording area being digital data of a TV signal carrying at least one TV program signal and one CM portion signal carrying commercial message, and stored in the management recording area being management data, having data on locations of the CM portion signal, indicating whether the digital data is the TV program or the commercial message;

skipping the commercial message for a given period; and reproducing the TV program based on the data on locations of the CM portion signal when the commercial message is skipped, wherein the TV program that follows the commercial message is reproduced after the given period elapses even if the stored commercial message is longer than the given period.

7. A method of reproducing a TV signal comprising the steps of:

reproducing the TV signal at a given reproduction speed from a storage medium having a bistream recording area and a management recording area, stored in the bitstream recording area being digital data of a TV signal carrying at least one TV program signal and one CM portion signal carrying commercial message, and stored in the management recording area being management data, having data on locations of the CM portion signal, indicating whether the digital data is the TV program or the commercial message;

skipping the commercial message for a given period;

reproducing the TV program based on the data on locations of the CM portion signal when the commercial message is skipped, wherein the TV program that follows the commercial message is reproduced even if current data to be reproduced is the commercial message after the given period elapses.

8. A method of reproducing a TV signal comprising the steps of:

reproducing the TV signal at a given reproduction speed from a storage medium having a bitstream recording area and a management recording area, stored in the bitstream recording area being digital data of a TV signal carrying at least one TV program signal and one CM portion signal carrying commercial message, and stored in the management recording area being management data, having data on locations of the CM portion signal indicating whether the digital data is the TV program or the commercial message;

skipping the commercial message for a given period; and reproducing the TV program based on the data on locations of the CM portion signal when the commercial message is skipped, wherein the TV program that follows the commercial message is reproduced after the given period elapses even if the stored commercial message is shorter than the given period.

* * * * *